– Patented Feb. 6, 1951

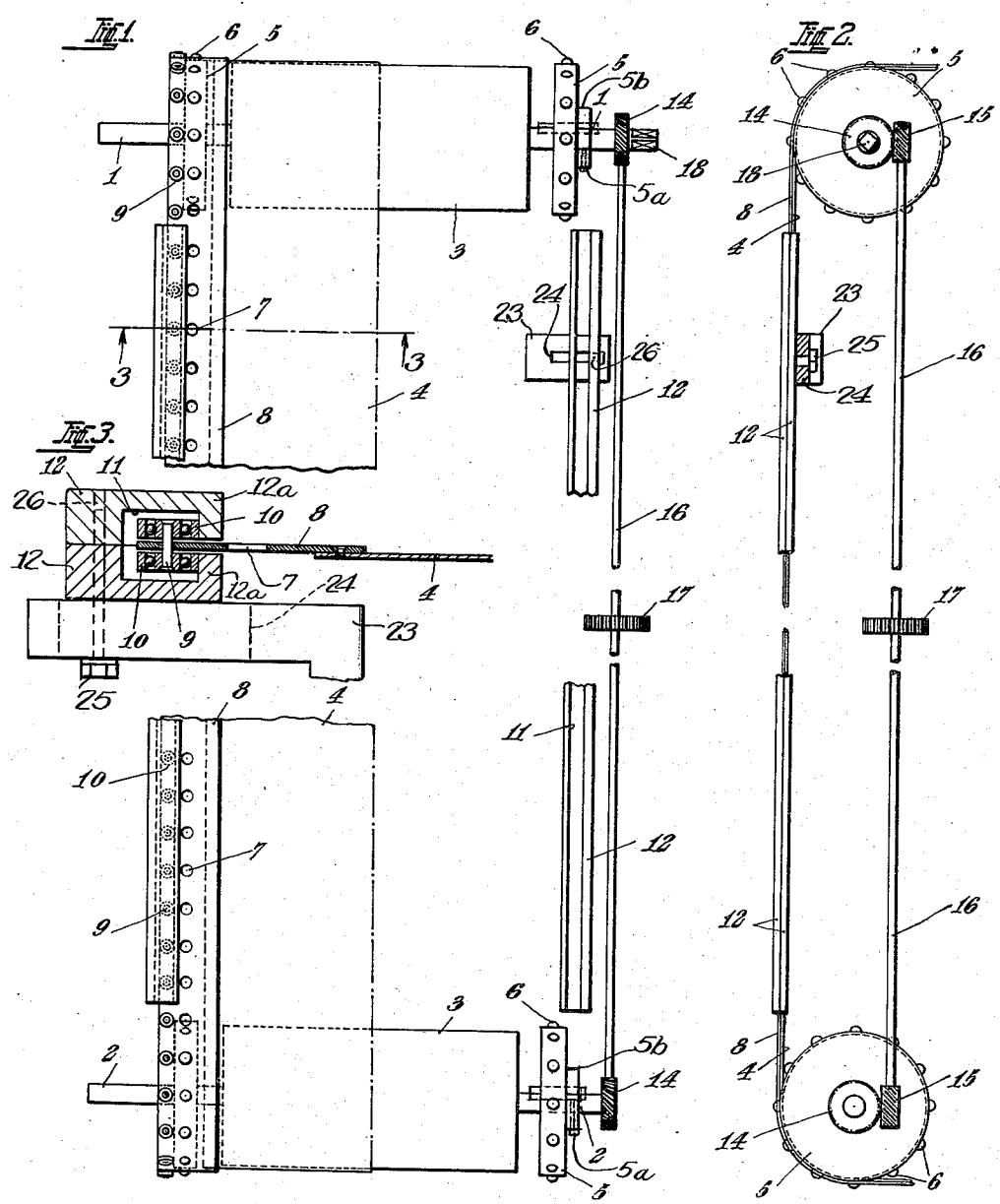

2,540,862

UNITED STATES PATENT OFFICE 2,540,862

PRINTING TABLE CONVEYER FOR PATTERN PRINTING

Fritz Buser, Wiler, Switzerland

Application May 29, 1948, Serial No. 30,149
In Switzerland August 14, 1947

6 Claims. (Cl. 198—202)

This invention relates to a printing table conveyor for pattern printing having an endless conveyor belt to serve as a travelling carrier for the web material to be printed, which conveyor belt is disposed around two supporting rollers which are mounted to rotate on parallel axes.

An object of the present invention is to provide a printing table of the above type wherein each of the two rollers is mounted on a shaft to freely rotate thereon, between two wheels fixed on the shaft, and wherein laterally along the edges of the conveyor belt are arranged two endless metal bands which are mounted on the wheels to be revolved by them, whereby the edges of the metal band facing the conveyor belt overlap the respective edges of the latter and are connected therewith at least here and there, so that, when revolving the metal bands, the conveyor belt together with the web material lying thereon will be taken along.

Another object of the invention is to provide means to guide the metal bands in the accurate feeding direction and at a constant width from each other, so that the conveyor belt is maintained therealong substantially straight and taut and the web material to be printed is uniformly supported by the taut supporting surface area of the conveyor belt.

A further object of the invention is to provide means for driving the wheels feeding the conveyor belt together with the web material lying thereon at an equal speed.

These and other objects and advantages of the invention will appear from the following detailed description of one preferred embodiment of the invention illustrated in the accompanying drawing, in which:

Fig. 1 is a top plan view with certain parts broken away.

Fig. 2 is a lateral elevation with parts in vertical section, and

Fig. 3 is a detail view in vertical section taken along line 3—3 in Fig. 1, drawn to a larger scale.

The printing table comprises two shafts 1 and 2 supported in bearings not illustrated in the drawing, to rotate on parallel axes. Each shaft carries a roller 3 freely rotatable thereon. An endless conveyor belt 4 is tightly mounted round the two supporting rollers 3 to revolve round them. Sprocket wheels 5 are mounted on the shafts 1 and 2 for rotation therewith, one on either side of each roller 3. The sprocket wheels 5 have hemispherical teeth 6 on their circumference to engage into circular holes 7 of a metal band 8 preferably a steel band, two such steel bands being arranged along the two longitudinal edges, respectively, of the conveyor belt 5. Each steel band 8 overlaps the corresponding edge of the conveyor belt which is secured to the overlapping portion of the steel band, for instance by rivets 13, to be taken along, when the shafts 1 and 2 will be rotated. The steel band 8 has an outer border protruding laterally over the sprocket wheel 5 and being provided with regularly spaced holes, each having a pin 9 fixed therein which projects on either side of the steel band and carries on each projecting end a guide roller 10 mounted on a ball bearing. Two guide bars 12 are provided for the straight section in the upper stretch of the steel band 8, which have formed therein a longitudinal groove 11 to receive the upper and lower rollers and which are thus shaped and assembled that the grooves 11 form together a recess within the two bars 12 which has overhanging longitudinal flanges 12a and communicates with the outside through a longitudinal slot on the side of the rails facing the conveyor belt 4, through which slot the steel band 8 extends from the guide rollers 10 to the conveyor belt 4. Such guide bars 12 are provided for both steel bands 8 and at least the guide bars 12 and the corresponding sprocket wheels 5 on one side of the conveyor belt are arranged to be laterally adjustable in some conventional manner, for instance, the wheel 5 by means of set screw 5a passing radially through hub portions 5b of the wheel 5 on one side of the machine, and the rails 12 on one side of the machine by being mounted on brackets 23 provided with transverse slots 24 through which screws 25 project into threaded bores 26 in the rails 12 to increase the width between the guide bars to stretch the conveyor belt transversally to the feeding direction and to prevent the same from sagging and decreasing the width between its edges.

A worm wheel 14 is fixed on one end of the shafts 1 and 2, which is in gear with a worm 15 fixed on a shaft 16 below the worm wheel 14. This shaft 16 extends alongside the conveyor belt and carries also the worm 15 of the other worm gear which is of equal size and pitch. A toothed wheel 17 on the shaft 16 may be driven by an intermittent gear which is not shown in the drawing, to rotate shaft 16 and thereby to advance the conveyor belt together with the web material lying thereon, by steps. Both worm wheels 14 on the shafts 1 and 2, respectively, are arranged to be disengageable from their worms 15 and the projecting end of shaft 1 forms a square head 18 at the descending end of the conveyor belt adapted to receive a detachable crank (not shown), in order to rotate shaft 1 and conveyor belt 4 by hand, for adjusting purposes.

What I claim is:

1. A printing table conveyor for screen printing comprising two parallel shafts arranged rotatably at opposite ends of the conveyor, means for synchronously driving said shafts, two support rollers freely rotatable on said shafts, an endless conveyor belt passing around said support rollers to serve as a travelling carrier for web material to be printed, two wheels secured to each shaft on opposite sides of the associated roller, two endless metal strips extending along, overlapping, and being connected to the lateral edges of said conveyor belt, said strips being mounted on said wheels to be driven by them and to take said conveyor belt along, a series of regularly spaced guide rollers arranged along the edge of each metal strip for rotation about axes extending at right angles to the strip and disposed in a common plane parallel to the edge of the conveyor belt, and a pair of parallel guide bars disposed along the upper run of said strips and between said two series of guide rollers at a predetermined distance from each other, the guide rollers of each series being in rolling contact with the outer surface of the adjacent guide bar, whereby the conveyor belt is maintained in a transversely stretched condition and longitudinally guided along a perfectly straight path with a minimum of friction.

2. A printing table conveyor according to claim 1, in which said wheels and guide bar on one side of said conveyor belt are laterally adjustable.

3. A printing table conveyor as claimed in claim 1, in which said guide rollers are mounted on ball bearings.

4. A printing table conveyor as claimed in claim 1, in which two series of guide rollers are provided along the edge of each strip above and below the strip, respectively, and two pairs of guide bars are provided for cooperation with the two series of rollers above and the two series of rollers below each strip.

5. A printing table conveyor for screen printing comprising two parallel shafts mounted rotatably on opposite ends of the conveyor, means for synchronously driving said shafts, two support rollers freely rotatable on said shafts, an endless conveyor belt passed around said support rollers to serve as a travelling carrier for web material to be printed, two wheels secured to each shaft on opposite sides of the associate support roller, two endless metal strips extending along, overlapping and being connected to the lateral edges of the conveyor belt, said strips being mounted on said wheels to be driven by them and to take said conveyor belt along, two series of regularly spaced guide rollers arranged along the edge of each strip above and below the latter for rotation about axes extending at right angles to the strip and disposed in a common plane parallel to the edge of the belt, two parallel guide rails disposed along the upper run of each strip at a predetermined distance from each other and having a longitudinal groove formed therein to receive the rollers arranged along the edge of the adjacent metal strip, and at the free edges of said groove downwardly and upwardly projecting longitudinal flanges overhanging said rollers and forming bearing surfaces for the latter during their travel along the upper run of the metal strips.

6. A printing table conveyor as claimed in claim 5, in which said wheels and guide rail on one side of said conveyor belt are laterally adjustable.

FRITZ BUSER.

REFERENCES CITED

The following references are of record in the file of this patent:

UNITED STATES PATENTS

| Number | Name | Date |
|---|---|---|
| 1,182,331 | Taylor | May 9, 1916 |
| 1,711,576 | Paterson | May 7, 1929 |
| 1,843,208 | Cutler | Feb. 2, 1932 |
| 1,847,148 | Vogeley | Mar. 1, 1932 |